United States Patent

Herring et al.

[15] 3,696,985

[45] Oct. 10, 1972

[54] METHODS OF AND APPARATUS FOR ALIGNING AND BONDING WORKPIECES

[72] Inventors: Carl R. Herring, Allentown; Fred J. Schneider, Catasauqua, both of Pa.

[73] Assignee: Western Electric Company, Incorporated, New York, N.Y.

[22] Filed: Dec. 31, 1969

[21] Appl. No.: 889,447

[52] U.S. Cl. .......................228/4, 29/471.1, 29/589, 219/78, 228/1, 228/3

[51] Int. Cl. .............................................B23k 1/00

[58] Field of Search.............29/626, 589, 471.1, 993; 228/3, 1, 6, 47, 3.5; 219/85, 78, 125; 156/73, 323

[56] References Cited

UNITED STATES PATENTS

| | | | |
|---|---|---|---|
| 3,548,493 | 12/1970 | Hubbard | 29/626 |
| 3,520,055 | 7/1970 | Jannett | 29/626 X |
| 3,275,795 | 9/1966 | Bosna et al. | 219/125 |
| 3,271,555 | 9/1966 | Hirshon et al. | 219/85 |
| 3,048,690 | 8/1962 | Byrnes, Jr. et al. | 219/85 |
| 2,710,046 | 6/1955 | Markus et al. | 154/125 |
| 3,374,531 | 3/1968 | Bruce | 29/471.1 X |
| 3,533,155 | 10/1970 | Coucoulas | 29/471.1 |

*Primary Examiner*—John F. Campbell
*Assistant Examiner*—R. J. Craig
*Attorney*—W. M. Kain, R. P. Miller and R. Y. Peters

[57] ABSTRACT

Bonding machines have transparent elements on their bonding axes. Magnified optical means are positioned to view bonding tips and integrated-circuit chips simultaneously through the transparent elements thereby facilitating alignment of the chips to the tips. In one embodiment a bonding tip is transparent and a transparent compliant bonding member is utilized in conjunction with the tip to produce compliant bonds. Another embodiment utilizes a transparent tip in a "-hard tip" type of bonding operation. A third embodiment utilizes a transparent tray closely positionable to the bonding tip. After alignment of the tip to one of the chips is achieved the tray is removed and bonding proceeds on an accurately positioned substrate.

20 Claims, 18 Drawing Figures

PATENTED OCT 10 1972

3,696,985

METHODS OF AND APPARATUS FOR ALIGNING AND BONDING WORKPIECES

BACKGROUND OF THE INVENTION

1. Field of the Invention

This invention relates to methods of and apparatus for bonding workpieces together wherein rapid and accurate alignment of workpieces to a bonding tip is achieved. In particular, the invention relates to systems wherein viewing of the workpieces and the tip to which alignment is to be achieved is performed through transparent elements on the bonding axes of machines used for making the bonds.

2. Description of the Prior Art

In apparatus used for bonding electronic devices such as integrated-circuit chips to substrates, one of the principal problems is aligning the integrated-circuit chips to bonding tips or apertures in compliant bonding members, then engaging the chips to the tips or apertures, and aligning the chips with a pattern on a substrate. A broad spectrum of optical systems have been utilized to facilitate such alignment. Most of the systems have some inherent limitations and are thus not entirely satisfactory.

One of the most common systems employs a half silvered mirror suspended between a bonding tip and a plane on which either chips or a substrate lie. An optical axis of a microscope is obliquely directed to the half silvered mirror and an image of both the tip and a chip or substrate on the plane over the mirror appear simultaneously in the microscope eyepiece. However, the oblique viewing causes perspective distortions and accurate alignment is difficult to achieve because of such distortions. Additionally, because the mirror is suspended between the tip and the workpiece with which the tip must be engaged, the mirror must be mounted on a swing-away mechanism which adds complexity to the bonding apparatus.

The oblique viewing problems associated with half silvered mirrors are eliminated to a certain extent through the use of beam-splitter prism combinations which are suspended similarly to the mirror but which direct an image of both a tip and a workpiece perpendicularly of a bonding axis on which it is suspended. These combinations however, require very accurate alignment to the bonding axis and thus the supporting mechanism, in addition to being capable of swinging away from the bonding axis, must have adjustments provided thereon to achieve precise planar alignment of the prism.

Systems employing reference reticles have also been used to accomplish the desired alignments. Such systems are described in U.S. Pat. No. 3,477,630 issued to F. J. Schneider on Nov. 11, 1969. These systems, while performing admirably when properly adjusted, do suffer from the limitation that accurate alignment of a mechanism which positions a movable head requires very precise adjustment with respect to the reference reticle in order to achieve the necessary degree of accuracy.

Even more complex systems have been utilized employing rapidly oscillated mirrors to project images of workpieces and bonding tips simultaneously to an operator while an operator tries to achieve alignment therebetween. Obviously, systems that use oscillating mirrors suffer from problems associated with inherent complexity.

Except for the reference reticle system, the above described systems have one common shortcoming. Some optical element of the apparatus must be at least temporarily suspended between the bonding tip and the workpiece. In order to provide space for these elements, the bonding tip must travel extensive distances in accomplishing either engagement with the workpiece for pickup purposes or for bonding purposes. Extensive travel of the bonding tip inherently carries with it difficulty in providing precise positioning of the bonding tip throughout its range of operation.

SUMMARY OF THE INVENTION

It is an object of the invention to provide systems for facilitating rapid and accurate alignment of workpieces and force-producing elements in bonding apparatus.

It is another object of the invention to provide systems wherein force-producing elements in bonding apparatus are required to move only very short distances.

It is a further object of the invention to provide bonding apparatus in which workpieces and force-producing elements can be viewed in a direct line of sight along a bonding axis.

It is a more particular object of the invention to provide systems wherein bonding of workpieces can be performed under continuous visual surveillance.

It is an even further object of the invention to provide bonding apparatus wherein the workpieces can be observed during bonding therebetween so that distortions of the beam leads caused by bonding can be controlled in response to the viewing thereof.

The foregoing and other objects are accomplished in accordance with the invention by utilizing transparent elements positioned on bonding axes of bonding apparatus. Workpieces are aligned to force-producing members in response to images of the workpieces and the members which pass through the transparent elements.

Particular examples of apparatus useful in practicing the invention include bonding apparatus with transparent bonding heads, bonding apparatus which employs transparent film as a compliant bonding medium and bonding apparatus in which workpieces are supported on a transparent workpiece-supporting tray which swings away from a bonding axis after a workpiece is aligned and engaged with a bonding tip in response to an image passing through the tray.

DETAILED DESCRIPTION OF THE DRAWINGS

Other objects and features of the present invention will be more readily understood from the following detailed description of specific embodiments thereof when read in conjunction with the appended drawings in which.

DETAILED DESCRIPTION

Illustratively, the invention is described in connection with bonding beam-lead integrated-circuit chips to conductive elements which are pattern generated on ceramic substrates. However, it is to be understood that the invention can be useful in the bonding of many types of small articles where accurate alignment between parts is important.

Figure 1:
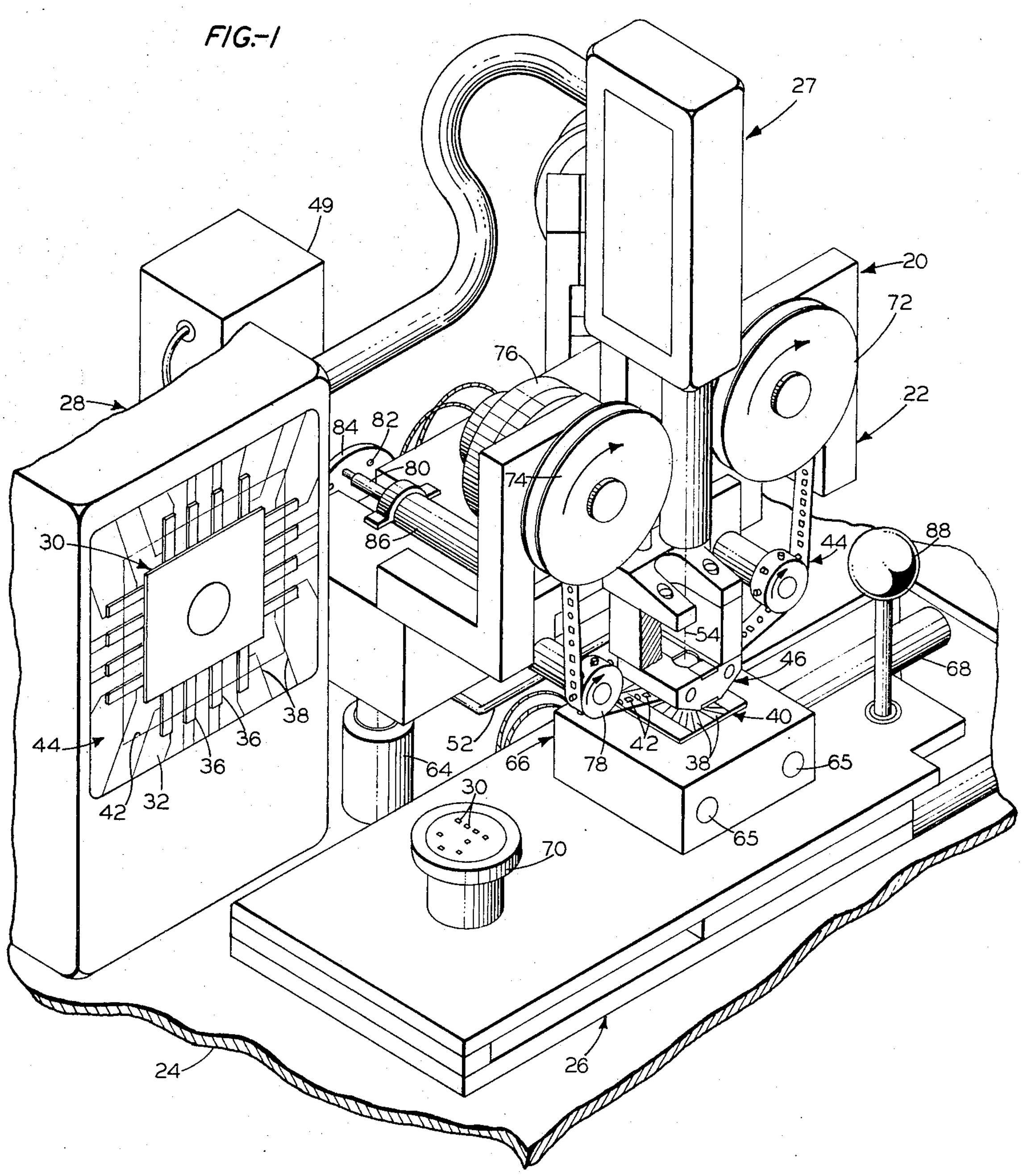
FIG. 1 is a perspective view of one embodiment of the inventive apparatus.

One embodiment of the inventive apparatus, a compliant bonding machine, designated generally by the numeral 20, is illustrated in FIG. 1. The bonding machine includes a movable head assembly, designated generally by the numeral 22, a base 24, a conventional positioner assembly designated generally by the numeral 26, and an electronic optical system including a television camera, designated generally by the numeral 27 and a monitor designated generally by the numeral 28. Even though the machine 20 is illustrated with an electronic optical system however, a conventional microscope might also be used with equal effectiveness.

Operation of the machine 20 can best be understood by a discussion and description of one complete bonding cycle. As illustrated in FIG. 1, a beam-lead integrated-circuit, designated generally by the numeral 30, is illustrated on a screen 32 of the monitor 28. The image on the screen illustrates leads 36 of the chip 30 being well aligned with conductive elements 38 which are patterns generated on a ceramic substrate, designated generally by the numeral 40.

At the point in time shown in FIG. 1, the monitor 28 is showing an image of the chip 30 engaged with a bonding aperture 42 of a compliant member, designated generally by the numeral 44. The compliant member 44 is transparent and for this reason, the substrate 40 below the compliant member is visible through the optical system 28.

One example of a material suitable for use as the compliant member 44 is polyimide film. One example of such a film is marketed by E. I. DuPont DeNemours and Co. of Wilmington, Delaware under the tradename "Kapton". By way of example, a film thickness of 0.005 inch has been found to be suitable for chips which are approximately 0.002 inch thick.

For increased visability, the compliant member 44 may be colored. Sensing the color is done readily with a microscope but an electronic optical system must have color sensing capability to take advantage of the additional visibility which color imparts to the compliant member 44.

The chip 30 is held in engagement with the compliant member 44 by vacuum developed within a bonding head, designated generally by the numeral 46. The inner structure of the head 46 is more clearly illustrated in FIG. 2. A vacuum chamber 48 is formed in the ram 46 and is connected to a vacuum source 49 through a port 50 and tubing 52 (see FIG. 1).

In order that the optical system 28 can receive images of the chip 30, the substrate 40 and the compliant member 44, the vacuum chamber 48 is constructed so that the walls through which an optical axis 54 passes are transparent. It will be noted that the optical axis 54 is also the bonding axis of the machine 20. The uppermost wall is a clear glass or quartz disc 56. Directly below the disc 56 is a clear glass or quartz engagement portion or bonding tip, designated generally by the numeral 58. The tip 58 is provided with an aperture or vacuum port 60 through which the force of vacuum within the chamber 48 can be transmitted to the chip 30.

The chip 30 is shown in "engagement" with the tip 58 under the influence of the forces of the vacuum source 49. Although the chip 30 is being held compressively against the tip 58, there is no actual contact therewith. The thickness of the compliant member 44 is greater than the thickness of a body portion 61 of the chip 30 and thus, no actual contact between the chip and the tip occurs in this embodiment during "engagement".

The tip 58 is advantageously provided with a projection 62. The projection provides a way of localizing bonding forces to a small region of one of the substrates 40. This localization is often desirable when a number of the chips 30 are bonded on one of the substrates 40. The projection 62 will fit into a small space on the substrate 40 during bonding and the likelihood is reduced of disturbing another one of the chips which has previously been bonded nearby on the substrate.

Conventional cartridge heaters 63 are also provided in the head 46 in order to provide for heating of the chip 30 prior to and during bonding.

It can be seen in FIG. 1 then, that the chip 30 is in a position wherein it can be properly bonded to the metallic elements 38. Bonding is accomplished by lowering the movable head assembly 22 along conventional slide assemblies 64. After the assembly 22 is lowered, a conventional compliant bond is produced between the leads 36 and the conductive elements 38. A detailed description of the characteristics and techniques for producing compliant bonds with polyimide can be had by referring to an application for U.S. Pat. Ser. No. 864,856 filed in the names of J. A. Burns and A. Coucoulas on Oct. 8, 1969, and assigned to the assignee of record of this application.

A substantial amount of heat is required to produce an effective thermocompression bond and it is found desirable to supplement the heating produced by the heater 63 in the head 46 by heating the substrate 40. This is best accomplished by putting conventional heaters 65 in a substrate support designated generally by the numeral 66.

After the bond is complete, the head assembly 22 is raised again to the position shown in FIG. 1. The positioner assembly is moved to the right along conventional slide members 68 until a chip tray 70 is positioned on the optical axis 54. The compliant member 44 is also indexed so that a subsequent one of the bonding apertures 42 is aligned with the axis 54.

It can be seen from FIG. 1 that the compliant member 44 is a continuous strip which is wound from a supply reel 72 to a takeup reel 74. The takeup reel 74 has torque continuously applied to it by a conventional torque motor 76. Control of the movement of the takeup reel 74 is provided through an indexing sprocket 78.

The indexing sprocket 78 is moved in accurately controlled 45° increments. Movement of the member 44 is initiated when a cylinder-actuated pin 80 is withdrawn from one of eight holes 82 in a plate 84. The pin 80 is controlled by a spring-biased cylinder 86 and the cylinder acts only momentarily to pull the pin out of the hole 82 with which it is engaged. As soon as the pin 80 is free from the hole 82, the plate 84, which is on the same shaft as the sprocket 78, begins to rotate because of the force exerted on the sprocket by the member 44. After 45° of rotation the pin 80 snaps into the next one of the holes 82 and motion of the compliant member 44 stops. Spacing between bonding aperture 42 is such that 45° rotation of the sprocket 78 results in accurate location of the subsequent one of the apertures 42 on the optical axis 54.

Figure 3:
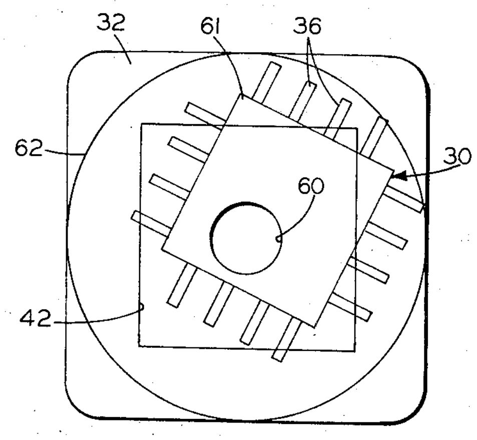
FIG. 3 is a view of a monitor portion of the machine of FIG. 1 showing a workpiece misaligned with respect to a portion of the machine.

After a new one of the bonding apertures is aligned with the optical axis 54, an image, such as that shown in FIG. 3, appears on the screen 32 of the monitor 28. An operator can see the aperture 42 and the projection 62 of the tip 58 as well as any one of the chips 30 which is within the field of the camera 27. The chips 30 are not necessarily in an ordered array on the chip tray 70 and because of this, it is quite likely that the chip 30 may not be aligned with the aperture 42.

Figure 4:
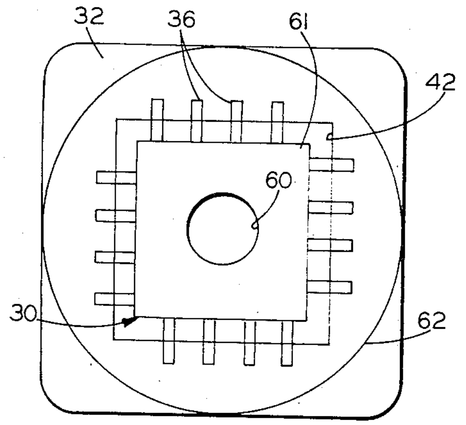
FIG. 4 is a view of the monitor of FIG. 3 showing the workpiece aligned.

To achieve alignment, an operator moves a handle 88 of the positioner assembly 26 and rotates the chip tray 70 while viewing the screen 32 until the image shown on FIG. 4 is achieved. FIG. 4, of course, illustrates the chip 30 being properly aligned with the aperture 42.

After the image of FIG. 4 is achieved, the head assembly is lowered and the force of vacuum within the chamber 48 brings the chip 30 into engagement with the head 46 by being drawn against the compliant member 44. After this engagement, the head assembly 22 is raised to the position shown in FIG. 1.

Figure 5:
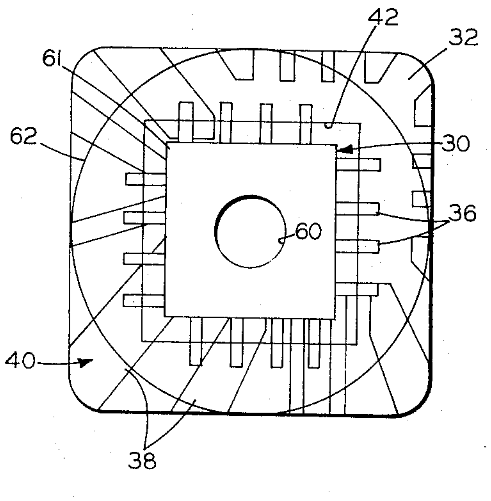
FIG. 5 is a view of the monitor of FIG. 3 showing a misalignment of a second workpiece.

The positioner assembly 26 is then moved to the left so that one of the substrates 40 is roughly aligned with the optical axis 54. At this time, the operator sees an image similar to that shown in FIG. 5 on the screen 32.

Figure 6:
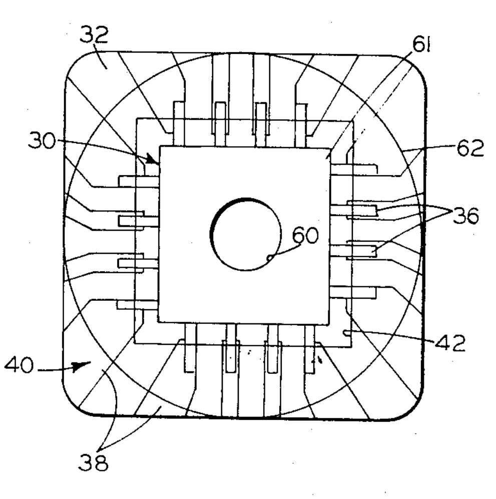
FIG. 6 is a view of the monitor of FIG. 3 showing an alignment between the two workpieces.

The operator then moves the positioner handle 88 to manipulate the substrate 40 while viewing the screen 32 to achieve alignment of the conductive elements 38 with the leads 36. After an image like that shown in FIG. 6 is achieved, bonding of the leads 36 to the elements 38 can take place and a full cycle of operation is thus completed.

It is important to note that the vertical movement of the head assembly 22 can be quite small. This is because there is no need to place complex optical system components between the tip 58 and the workpieces. It is desirable to take advantage of the fact that the movement can be small so that great precision can be developed in the machine 20.

Keeping the movement of the assembly 22 small also assures that the image of the aperture 42 and the image of the chip 30 supported on the tray 70 as well as the image of the conductive elements 38 supported on the substrate holder 66 are simultaneously within the depth of field of the optical system 28. It is also important to construct the machine 20 so that the chips 30 and the conductive elements 38 are supported at substantially the same elevation so that each of the respective images will be in focus when they are placed on the optical axis 54 by movement of the positioner assembly 26.

Figure 7:
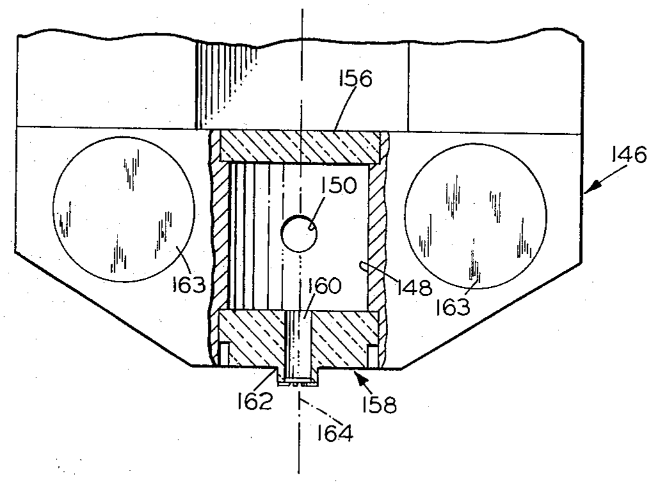
FIG. 7 is a partially sectioned elevational view of a bonding head which is an alternate embodiment of the invention apparatus.

Another embodiment of the inventive apparatus illustrated in FIG. 7 includes a non-compliant bonding head, designated generally by the numeral 146. The bonding head includes a vacuum chamber 148, a vacuum port 150, a transparent disc 156 and a transparent bonding tip 158. The head 146 can be used on a bonding machine similar to that shown in FIG. 1 with the exception that it is not necessary to use a compliant member. The head 146 is designed to be used in a so-called "hard tip" mode of operation. Provision must be made for permitting "compensation" to equalize bonding forces to all of the leads 36. One machine in which the head 146 may be advantageously employed is described in U.S. Pat. No. 3,475,814 issued to J. A. Santangini on Nov. 4, 1969. The head 46 may also be incorporated into a "compensating" arrangement by pivotally mounting the head.

Figure 2:
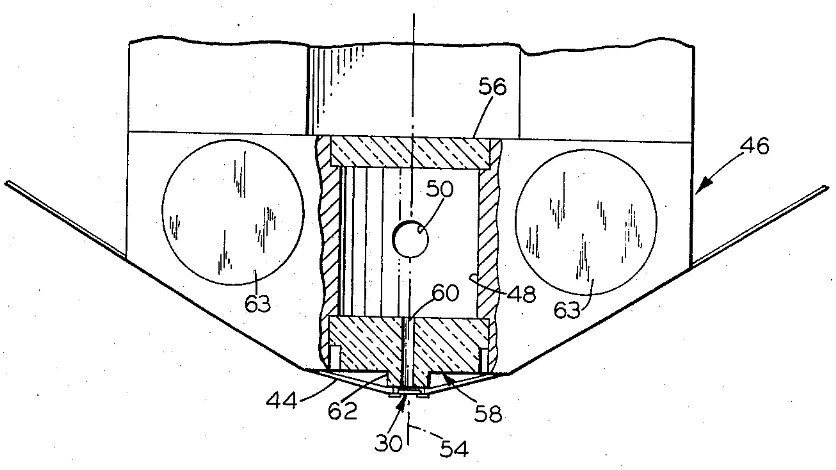
FIG. 2 is a partially sectioned elevation view of a bonding head portion of the machine of FIG. 1.

The tip 158 includes a projection 162 and an aperture 160. The aperture 160 is large enough so that the body portion 61 of one of the chips 30 will fit into the aperture with some clearance around all sides of the body portion. The relative size of the aperture 160 to the body portion 61 is shown quite clearly in FIG. 9. The projection 162 serves substantially the same purpose as the projection 62 (FIG. 2).

Some heat is transmitted through the tip 158 from cartridge heaters 163. Of course, it is still desirable to provide heating from sources other than the ram 146.

Figure 8:
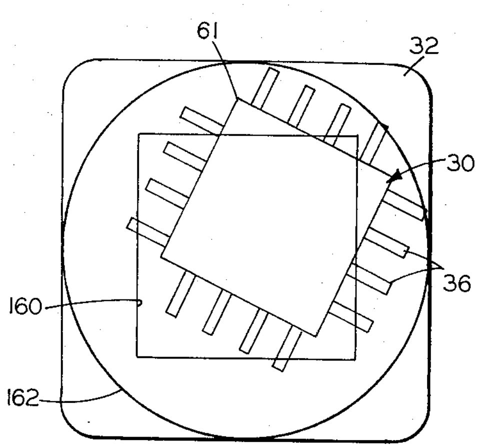
FIG. 8 is a view of the monitor of the machine of FIG. 1 showing portions of the bonding head of FIG. 7.
Figure 9:
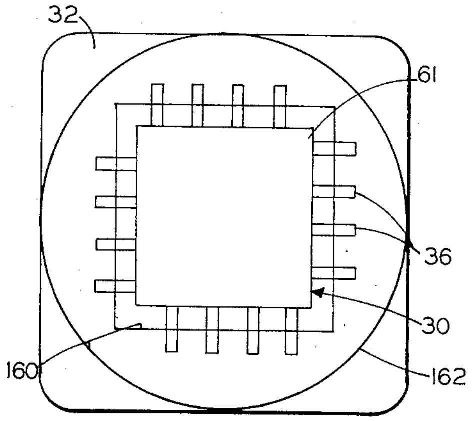
FIG. 9 is a view of the monitor of FIG. 8 showing alignment between a workpiece and portions of the head of FIG. 7.

In using the ram 146, an operator usually first encounters a situation in which the aperture 160 is misaligned with respect to one of the chips 30 such as that shown in FIG. 8. This is somewhat analogous to the situation shown in FIG. 3. The chip 30 is moved into proper alignment with the aperture 160 while being viewed along an optical-bonding axis 164 through an optical system that is operative because of the transparency of the disc 156 and the tip 158. FIG. 9 represents an image that an operator sees after proper alignment of the chip 30 and the aperture 160 is achieved.

Figure 10:
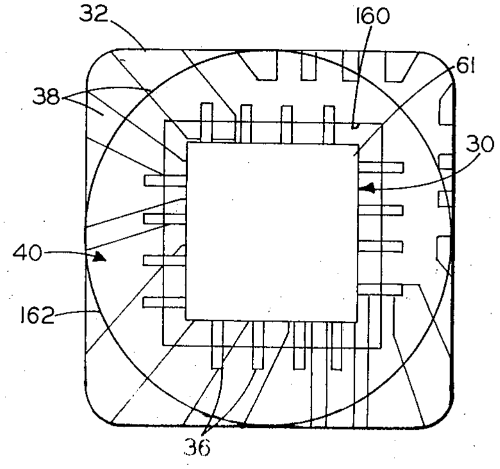
FIG. 10 is a view of the monitor of FIG. 9 showing an additional workpiece.

FIG. 10 illustrates the conductive elements 38 of one of the substrates 40 as they appear to an operator prior to final alignment of the substrate and the chip 30. The substrate 40 is carefully moved until the conductive elements 38 are properly aligned with the leads 36.

Figure 11:
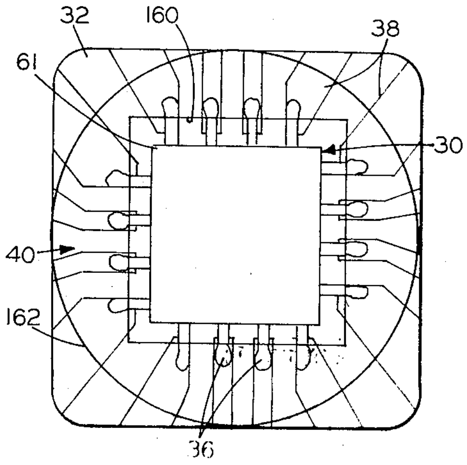
FIG. 11 is a view of the monitor of FIG. 10 showing the workpieces bonded together.

FIG. 11 illustrates an image that an operator sees during bonding of the leads 36 to the elements 38. One of the very significant advantages of this inventive apparatus is that it permits an operator to visually determine the extent of "squash out" of the leads 36 while bonding is proceeding. Thus, an operator has full visual capabilities for viewing a bonding process as it occurs. The operator can respond to excessive or insufficient "squash-out" and the likelihood of getting good quality bonds is greatly enhanced with this system.

Another embodiment of the inventive apparatus is illustrated in FIGS. 12 through 18. A bonding machine, designated generally by the numeral 180, includes a ram assembly, designated generally by the numeral 182; a chip handling assembly, designated generally by the numeral 184; a substrate positioner, designated generally by the numeral 186; and an optical system, designated generally by the numeral 188.

Figure 12:
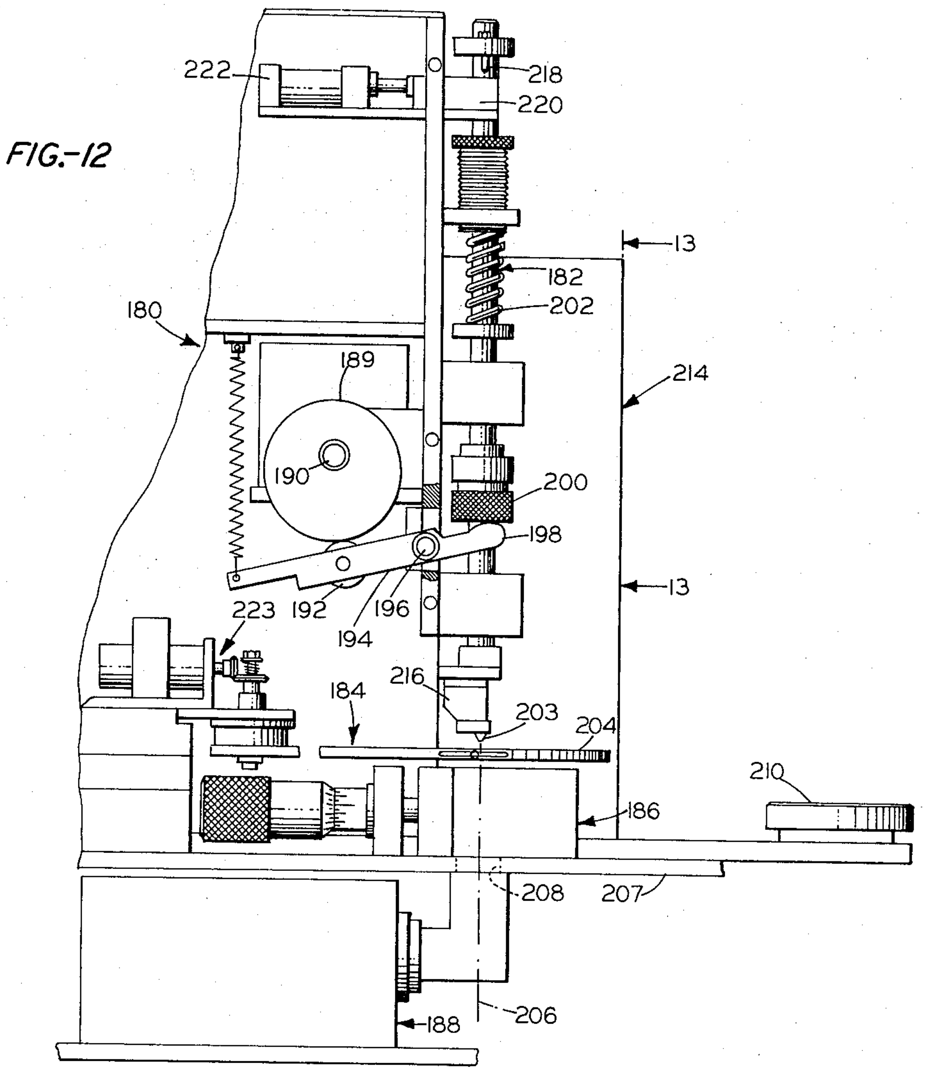
FIG. 12 is an elevational view of a bonding machine which is an alternate embodiment of the inventive apparatus.
Figure 13:
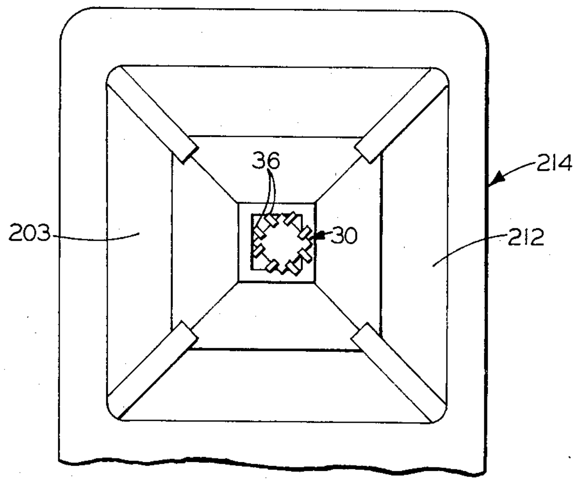
FIG. 13 is a view taken along the lines 13—13 of FIG. 12 showing a monitor which is portraying a workpiece and a bonding tip.
Figure 14:
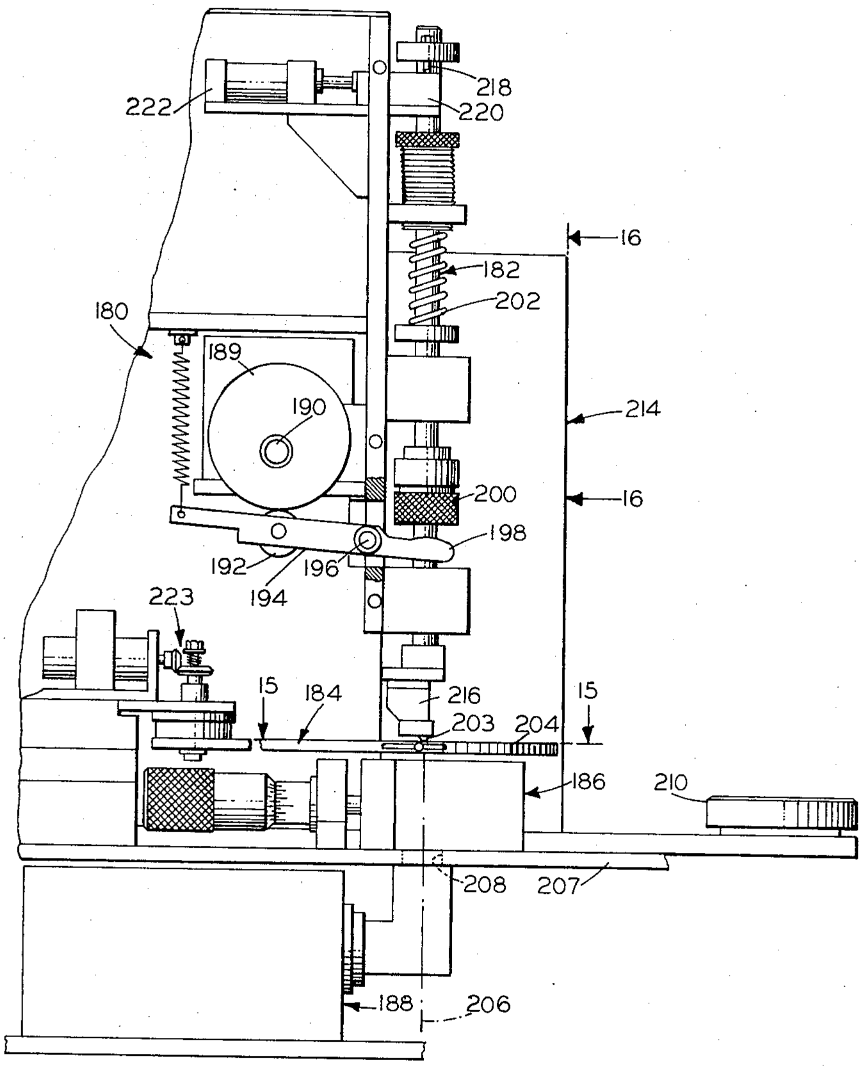
FIG. 14 is an elevational view of the machine of FIG. 12 in a workpiece pickup position.

Here again an understanding of the structure and operation of the machine 180 can best be understood by discussion of one full cycle of the operation. FIG. 12 illustrates the ram assembly 182 in a raised position prior to alignment of one of the chips 30 supported on the chip handling assembly 184. The ram assembly 182 is raised by the action of an eccentric cam 189 rotating on a shaft 190 causing displacement of a roller 192 connecting to a lever arm, designated generally by the numeral 194. The lever arm pivots around a fulcrum 196. An engagement portion of the arm 194 presses against an adjustably positionable collar 200 when the cam 189 rotates to the position shown in FIG. 12, thus urging the ram assembly 182 upwardly against the force of a compression spring 202.

While the ram assembly 182 is raised, a tip 203 is held with its lower most surface approximately 0.015 inch from the surface of a transparent chip tray 204 of the chip handling assembly 184. This spacing can be varied by adjusting the collar 200 to assure that the chip 30 and the tip 203 are within the depth of field of the optical system 188.

When the tip 203 is held just above the tray 212, the optical system 188 can be used to produce an image of both the tip 203 and one of the chips 30. The optical system 188 is illustrated in FIG. 12 as being a conventional TV camera with a conventional right angle lens system that can be set to view along an optical axis 206. A microscope might also be used with equal success.

The optical axis is aligned with the bonding axis of the machine 180 and a support member 207 is provided with an aperture 208 through which the optical system 188 can receive the image of the chip 30 and the tip 203.

The chip handling assembly 184 is manipulated in the X and Y direction by a conventional manipulator 210. Angular manipulation is accomplished by rotating the tray 204. During manipulation an operator views the tip 203 and the chip 30 through a screen 212 of a monitor designated generally by the numeral 214 (FIG. 13), associated with the optical system 188. When the chip 30 is aligned properly with the tip 203, the tip is lowered to the position shown in FIG. 15, vacuum is applied within a bonding head 216 the chip 30 is held against the tip 203. The bonding head is advantageously of the type shown in U. S. Pat. No. 3,452,917 issued to F. J. Schneider on July 1, 1969. An image of one of the chips 30 properly aligned with the tip 203 is shown in FIG. 16.

Figure 15:
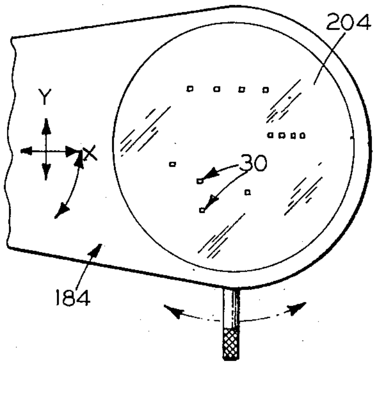
FIG. 15 is a view taken along the lines 15—15 of FIG. 14 showing a transparent tray supporting a number of workpieces.
Figure 16:
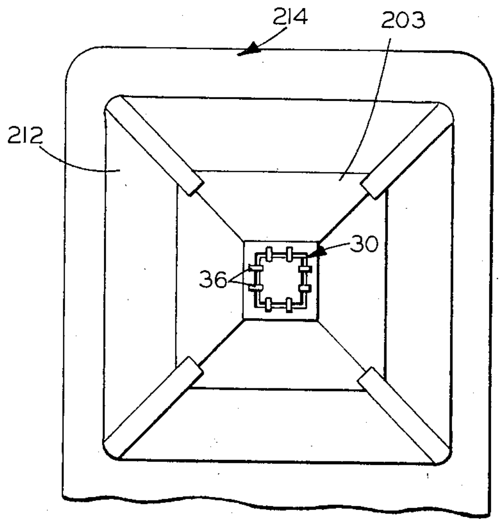
FIG. 16 is a view of the monitor of FIG. 13 illustrating a workpiece aligned with a bonding tip.

When the ram assembly 182 is in the pickup position of FIG. 15 a stop member 218 is engaged with a latch 220 which is operated by a cylinder 222. The cylinder 222 is shown in its extended position in FIG. 15. The stop member 218 is adjustable in length so that the force of the spring 202 is not transmitted to the tray 204 by the tip 203.

Figures 17, 18:
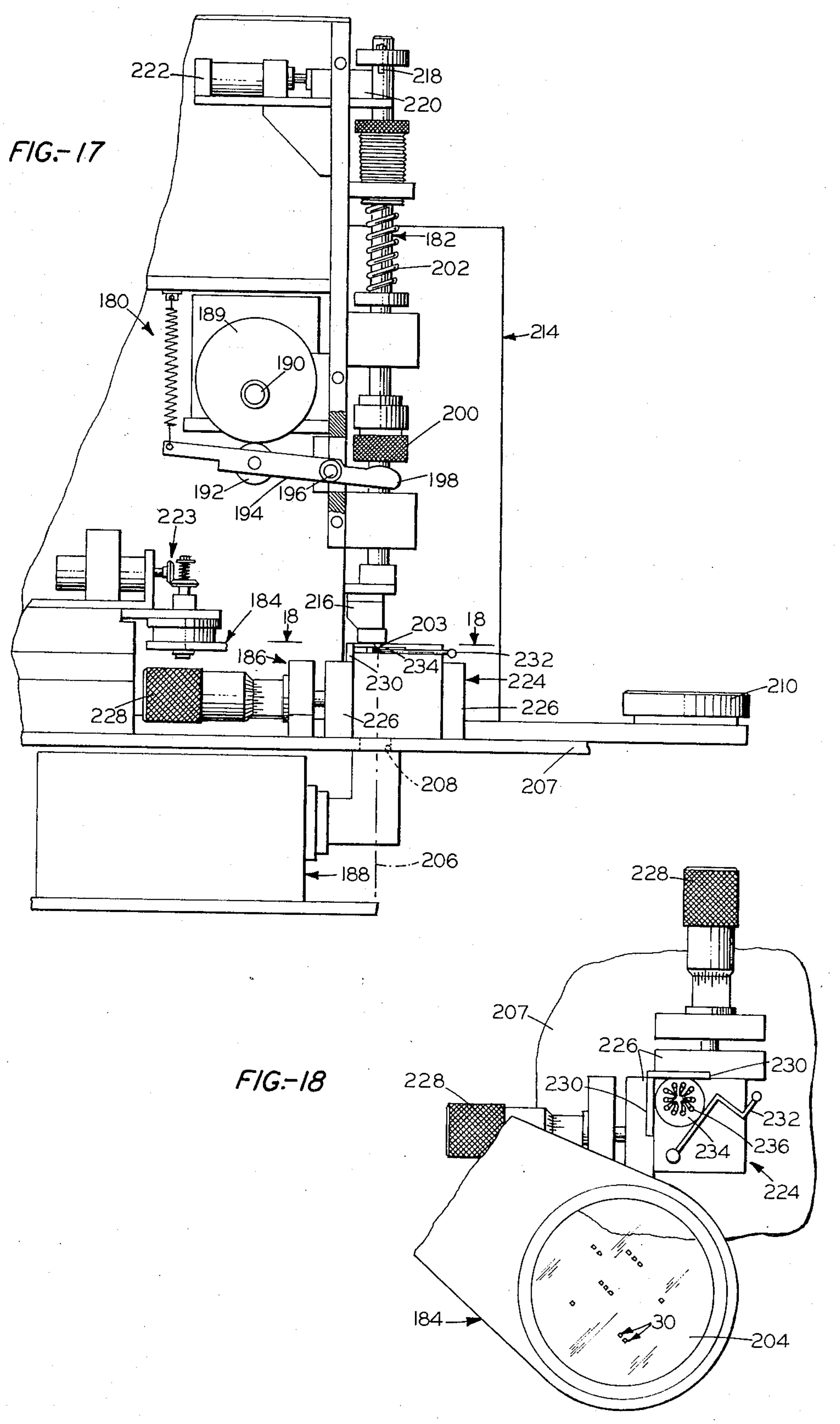
FIG. 17 is a view of the machine of FIG. 12 showing the machine in a bonding configuration and on which a portion of a support tray has been removed for purposes of clarity.
FIG. 18 is a view taken along the line 18—18 showing a substrate positioned for bonding on a bonding axis of the machine of FIG. 17.

After the chip 30 and tip 203 are engaged, the shaft 190 is rotated and the ram assembly 182 is raised. The latch 220 is retracted by the cylinder 222 and the tray 204 is swung away from the optical and bonding axis 206 under the action of a gear drive positioning mechanism designated generally by the numeral 223 of the chip handling assembly 184. FIG. 18 is an illustration of the extent to which the chip tray 204 is displaced from the axis 206.

With the ram assembly 182 in its raised position, a carefully machined substrate support block, designated generally by the numeral 224, is placed into engagement with the substrate positioner 186 as shown in FIGS. 17 and 18. The substrate positioner 186 includes two accurately positionable stop members 226. The members 226 are positioned by adjustment of micrometer adjusting screws 228.

The support block 224 is provided with two positioning members 230 placed at right angles to each other and a spring clamp 232. A substrate, designated generally by the numeral 234, is held against the members 230 by the clamp 232. Conductive elements 236 on the substrate are very accurately positioned with respect to the outer surface of the substrate so that the conductive elements become very accurately located with respect to the sides of the block 224. The micrometer screws 228 are adjusted so that a desired portion of the substrate 234 lies on the axis 206 after the block 224 is placed against the stop members 226. Thus, the chip 30 which is engaged with the tip 203 can be bonded at a desired location on the substrate without actual visual control of alignment of the substrate 234.

Bonding occurs when the ram assembly 182 is lowered with the latch 220 withdrawn. Rotation of the cam 188 permits the ram assembly 182 to move downwardly under the action of the spring 202 until the tip 203 presses the leads 36 against the substrate 234, at which time bonding between the leads 36 and the conductive elements 236 takes place with the spring 202 providing the bonding force.

The ram assembly 182 is again raised by rotation of the cam 188. The latch 220 is moved outwardly, the chip tray 204 is swung back into the axis 206, and a new cycle of operation can begin.

It can be recognized that in a situation where a number of the chips are to be bonded onto one substrate, that a number of the bonding machine 180 can be positioned along an assembly line and each of the substrate positioners 186 can be adjusted to accommodate a particular chip location on the substrate. Thus, one of the substrates 234 mounted on one of the blocks 224 can be passed from one of the machines 180 to successive ones of the machine where chips can be bonded at various locations on the substrates thereby creating a highly efficient manufacturing operation. It should also be recognized that such a manufacturing scheme requires that the conductive elements 236 are very accurately located with respect to the outer surfaces of the substrates 234. The system is quite useful where the conductive elements 236 are produced by accurate photo-projection techniques.

It is to be understood that the above-described embodiments are merely illustrative of the principles of the invention, and that various modifications may be made from the specific details described without departing from the spirit and scope of the invention.

What is claimed is:

1. In a method of compliant bonding wherein metal-to-metal bonding of a first workpiece to a second workpiece is accomplished by the steps of clamping said workpieces together around the desired bond region between a support and a deformable compliant member, said member being capable of deformation around one of said workpieces, and applying sufficient thermal and/or mechanical bonding energy to said bond region to deform said member around said one workpiece and bond said workpiece, the improvement which comprises the steps of:
   - providing that said compliant member is transparent, and
   - viewing the workpieces through said transparent compliant member while aligning said workpieces to each other whereby said alignment is facilitated.

2. A method for compliantly bonding a first workpiece to a second workpiece, which comprises:
   - aligning the first workpiece to a predetermined portion of a transparent compliant bonding member said member being capable of deformation around one of said workpieces while viewing the workpiece through the member;
   - engaging the aligned first workpiece with the member;
   - aligning the engaged first workpiece with a predetermined portion of the second workpiece while viewing said workpieces through the member; and
   - compressively engaging, for a predetermined period, a bonding tip against the said portion of said second workpiece with the first workpiece and the compliant member therebetween to effect compliant bonding between the workpieces while viewing said workpieces through the member.

3. A method for thermocompression bonding a beam-lead integrated circuit chip to a substrate, which comprises:
   - aligning the chip to a predetermined portion of a transparent tip while viewing the chip through the tip;
   - engaging the aligned chip with the tip; aligning the leads of the engaged chip with a predetermined portion of the substrate while viewing the chip and substrate through the tip; and
   - compressively engaging for a predetermined period the tip against said portion of said substrate with the leads of the chip therebetween to effect bonding between the leads and the substrate while viewing said leads through the tip.

4. A method of bonding first workpieces to second workpieces, which comprises the steps of:
   - supporting a plurality of the first workpieces on a transparent tray;
   - moving the tray into intersecting relationship with a bonding axis of a bonding machine;
   - viewing along the bonding axis with a magnifying optical system through the transparent tray to simultaneously visualize a bonding tip and any of the first workpieces or portions thereof which are on or near the bonding axis;
   - manipulating the supporting tray in response to the visualization to align one of the first workpieces with the tip;
   - moving the tip along the bonding axis to engage the tip with the aligned first workpiece;
   - moving the tip to a retracted position;
   - moving the tray out of intersecting relationship with the bonding axis;
   - placing a second workpiece into a pre-positionable location so that a desired portion of the second workpiece is aligned with the bonding axis; and
   - moving the tip and the engaged first workpiece into compressive relationship with the second workpiece to effect bonding between the first workpiece and the desired portions of the second workpiece.

5. The method of bonding of claim 4 wherein the first workpieces are beam-lead integrated-circuit chips, the second workpieces are substrates and bonding is effected between the leads of the chips and conductive elements formed on the surface of the substrates.

6. In a bonding apparatus, a system for aligning a workpiece with a bonding tip which comprises:
   - a transparent tray for supporting the workpiece;
   - optical magnification means having a predetermined depth of field for viewing the workpiece and the bonding tip through the transparent tray;
   - means for supporting the transparent tray close enough to the bonding tip so that the tip and the workpiece are simultaneously within the depth of field of the optical magnification means; and
   - means for manipulating the transparent tray to align the workpieces with the bonding tip.

7. An apparatus for bonding beam-lead integrated circuit chips to conductive elements on substrates which comprises:
   - a bonding tip;
   - a transparent tray for supporting a plurality of the chips;
   - means for moving the tray into and out of intersecting relationship with the bonding axis;
   - magnifying optical means for viewing simultaneously the bonding tip and the chips or portions thereof which are on or near the bonding axis when the transparent tray intersects the bonding axis;

means for manipulating the tray in response to an image of the tip and the chips as seen through the magnifying optical means to align one of the chips with the tip;

means for moving the bonding tip along the bonding axis to engage the tip with the aligned chip and returning the tip to a retracted position;

a removable support block having two intersecting reference surfaces thereon and having a clamp assembly thereon for maintaining a desired portion of the conductive elements of the substrate at a desired location with respect to the reference surfaces of the block;

at least two stop members against which the reference surfaces of the block can be placed, the stop members being adjustable positionable with respect to the bonding axis, in a plane intersecting the axis, such that the desired portion of substrate can be aligned with the bonding axis when the support block is located against the stop members; and means for moving the bonding tip and the engaged chip into compressive engagement with the conductive elements of one of the substrates held in the desired location on the block against the stop members to effect bonding between the leads of the chip and the conductive elements of the substrate.

8. Apparatus for thermocompression bonding a first workpiece to a second workpiece, which comprises:

a bonding head capable of transmitting light through at least a tip portion thereof;

means for aligning said first workpiece to a predetermined portion of the tip;

means for engaging said aligned first workpieces to said tip;

means for aligning the engaged first workpiece with a predetermined portion of the second workpiece;

means for compressively engaging for a predetermined period the tip against the said portion of said second workpiece with the first workpiece therebetween to effect bonding between the workpieces; and means for viewing the first workpiece and said predetermined portion of the second workpiece through the light transmitting portion of the tip whereby said alignment of the first workpiece to the tip, the alignment of the first workpiece to the second workpiece and the compressive engagement between the workpieces is performable in response to visual information transmitted through said viewing means.

9. The apparatus of claim 8, which further comprises:

means for engaging a transparent compliant member with the tip whereby the apparatus can be made capable of producing compliant bonds.

10. The apparatus of claim 9 wherein the head comprises:

a hollow chamber internal of said head, the chamber being formed and located so that bonding axis passes two sides thereof;

being closed on one of its sides through which the bonding axis passes by the transparent engagement portion being in communication with the aperture in the engagement portion;

being closed at the opposite one of the sides through which the bonding axis passes by a transparent member; and having an aperture in one of the sides other than those through which the bonding axis passes which aperture is connectable to the vacuum source whereby the connection to the vacuum source is remote from the bonding axis and visibility along the axis is not impaired by such connection.

11. The apparatus of claim 8 wherein the bonding head includes a transparent engagement portion and the means for engaging the first workpiece with the head includes an aperture in said engagement portion connectable to a source of vacuum whereby said first workpiece can be held against said head by the forces of the vacuum source.

12. The apparatus of claim 11 wherein the aperture in the engagement portion is shaped to accommodate a body portion of a beam-lead integrated-circuit chip while leads of the chip bear against the engagement portion.

13. The apparatus of claim 8 wherein the bonding head includes a transparent engagement portion which is quartz.

14. The apparatus of claim 8 wherein the bonding head includes a transparent engagement portion which is glass.

15. In an apparatus for compliant bonding wherein metal-to-metal bonding of a first workpiece to a second workpiece including means for clamping said workpieces together around the desired bond region between a support and a deformable compliant member, said member being capable of deformation around one of said workpieces and means for applying sufficient thermal and/or mechanical bonding energy to said bond region to deform said member around said one workpiece and bond said workpiece, the improvement which comprises:

the compliant member being transparent; and the apparatus having means for viewing the workpieces through the transparent compliant member whereby alignment of the workpieces with each other and with the compliant member is facilitated.

16. The apparatus of claim 15 wherein the compliant member is formed of a film of polyimide film.

17. In a bonding head wherein a first workpiece to be bonded to a second workpiece is held in engagement with the head on a bonding axis prior to engagement with the second workpiece, the improvement which comprises:

the bonding head being transparent along the bonding axis whereby the engaged first workpiece is visible through the head, the second workpiece is visible through the head when the engaged first workpiece overlies the second workpiece and alignment between the workpieces is facilitated because of such visibility.

18. The bonding head of claim 17 which comprises: a transparent engagement portion against which the first workpiece bears, and an aperture in said engagement portion connectable to a source of vacuum whereby said first workpiece can be held against said head by the forces of the vacuum source.

19. The bonding head of claim 18 which comprises:

a hollow chamber internal of said head, the chamber being formed and located so that bonding axis passes two sides thereof;

being closed on one of its sides through which the bonding axis passes by the transparent engagement portion being in communication with the aperture in the engagement portion;

being closed at the opposite one of the sides through which the bonding axis passes by a transparent member; and having an aperture in one of the sides other than those through which the bonding axis passes which aperture is connectable to the vacuum source whereby the connection to the vacuum source is remote from the bonding axis and visibility along the axis is not impaired by such connection.

20. The bonding head of claim 18 wherein the aperture in the engagement portion is shaped to accommodate a body portion of a beam-lead integrated-circuit chip while leads of the chip bear against the engagement portion.

* * * * *